Figures 1, 2:
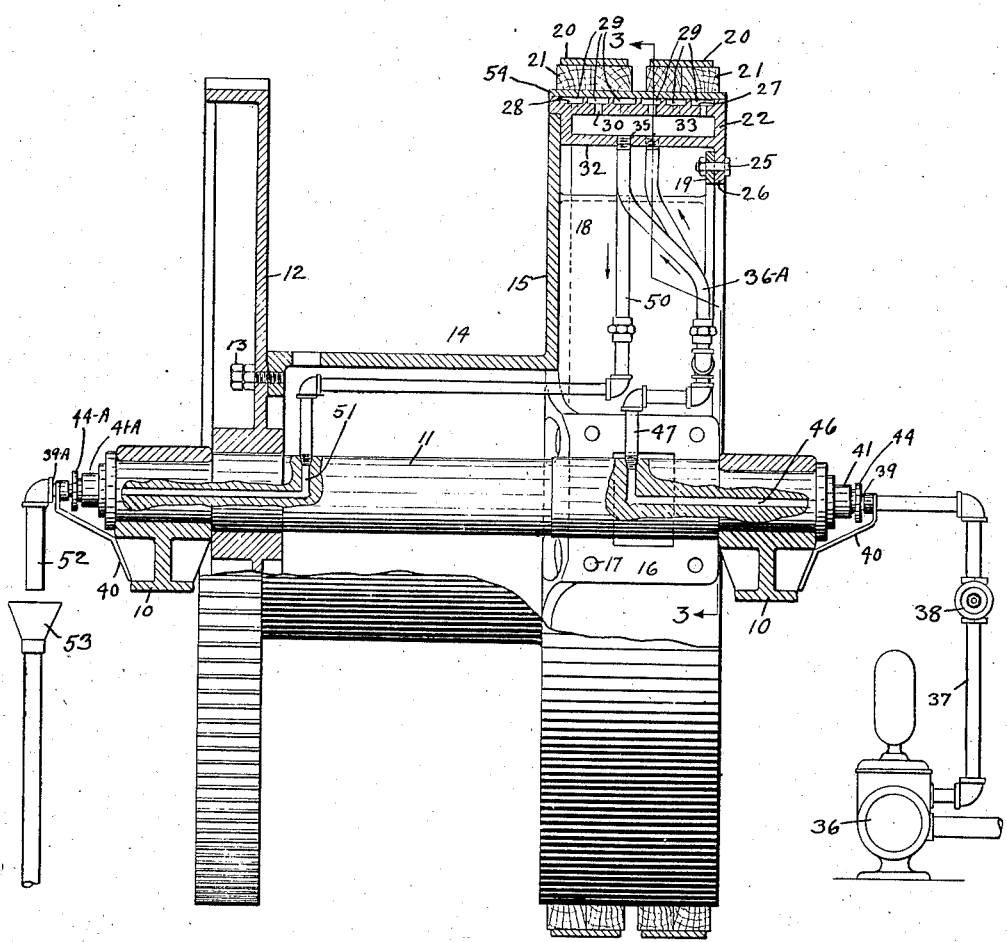

May 5, 1925.

H. E. BUKOWSKY 1,536,558

FORCED CIRCULATION BRAKE

Original Filed July 28, 1923     2 Sheets-Sheet 1

INVENTOR
H.E. BUKOWSKY
By C.B. Birkenbeul
ATTORNEY

May 5, 1925.  
H. E. BUKOWSKY  
1,536,558  
FORCED CIRCULATION BRAKE  
Original Filed July 28, 1923   2 Sheets-Sheet 2
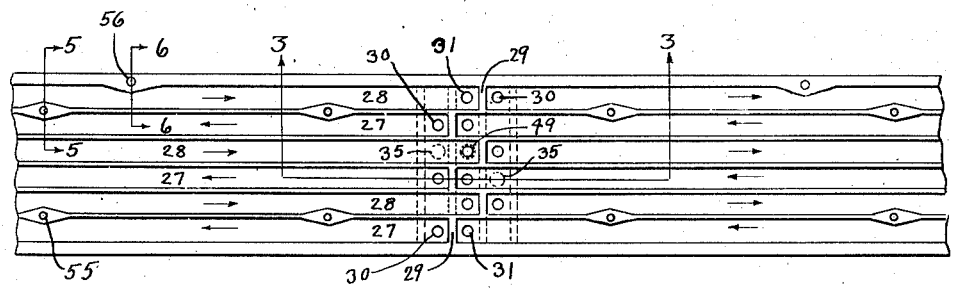
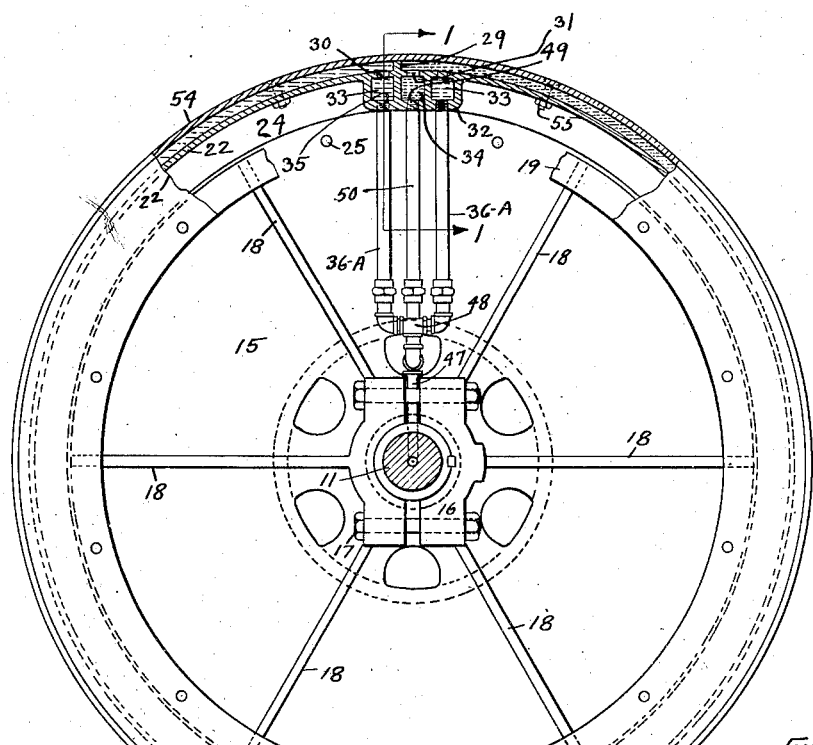
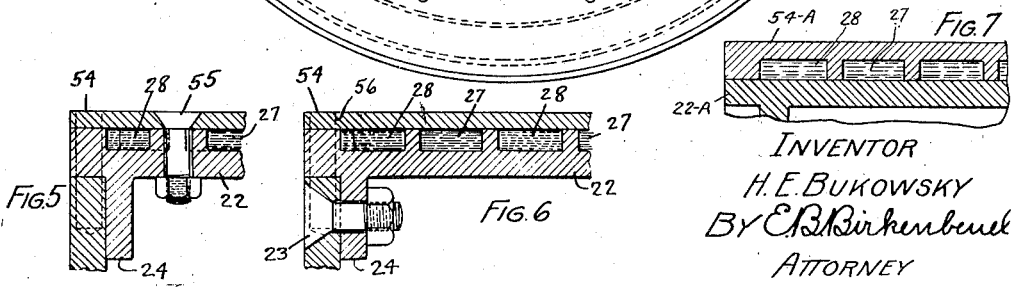
INVENTOR  
H. E. BUKOWSKY  
By E.B.Birkenbeuel  
ATTORNEY Patented May 5, 1925.

1,536,558

UNITED STATES PATENT OFFICE.

HARRY E. BUKOWSKY, OF PORTLAND, OREGON, ASSIGNOR TO WILLAMETTE IRON AND STEEL WORKS, OF PORTLAND, OREGON, A CORPORATION.

FORCED-CIRCULATION BRAKE.

Application filed July 28, 1923; Serial No. 654,494. Renewed March 25, 1925.

*To all whom it may concern:*

Be it hereby known that I, HARRY E. BUKOWSKY, a citizen of the United States, and a resident of Portland, in the county of Multnomah and State of Oregon, have invented a new and useful Forced-Circulation Brake, of which the following is a specification.

This invention relates more particularly to lowering engines such as are used in the logging industry when logs are transported down steep grades on logging trucks which are carried by steel rails. Under these conditions the lowering engine, to which this device is applied, is usually mounted at the top of the grade and is provided with a drum and cable which is attached to the logging truck; the lowering engine naturally having a large braking capacity and a relatively small power unit.

An object of my invention is the provision of an exceedingly simple and efficient means for forcibly cooling the braking surfaces of a lowering engine, in order to improve the braking action of the device.

A second object is economy of material and time by the reduction of replacements of brake parts.

A third object is reduction in loss of operating time occasioned by the burning up of the brake blocks.

A fourth object is to so construct the device that the cooling action will be uniform all over the braking surface.

A fifth object is to so construct the device that the temperature of the braking parts may at all times be readily observed and controlled.

I accomplish these results in the manner set forth in the following specification and illustrated in the accompanying drawings, in which:

Figure 1 is a front elevation of the braking drum of a lowering engine with portions cut away in section along the line 1—1 in Fig. 3. Figure 2 is an enlarged sectional view through the water injecting connection, which is a duplicate of the discharge connection. Figure 3 is a side elevation of a brake drum to which my device is applied, and having portions broken away in section along the line 3—3 in Fig. 1, and also along the line 3—3 in Fig. 4. Figure 4 is a development of a portion of the brake ring with the brake tire removed. Figure 5 is an enlarged section through the brake ring and tire along the line 5—5 in Fig. 4, showing the manner in which the tire is bolted to the brake ring. Figure 6 is a section along the line 6—6 in Fig. 4 showing one of the dowels which drives the brake ring, and the bolts which unite the brake ring to the cable drum. Figure 7 is a section through a modified form of brake ring and brake tire.

Similar numbers of reference refer to the same parts throughout the several views.

Referring in detail to the drawings, it will be observed that I have illustrated only such portions of a lowering engine as are needed to fully describe my device, among which are the usual bearings 10 which carry the drum shaft 11 upon which is mounted a drum gear 12, which is joined by the bolts 13 to the cable drum 14 having a flanged end 15 whose split central hub 16 is clamped on the shaft 11 by the bolts 17. Flat spokes 18 radiate from the hub 16 and are joined to the flange 15. A ring 19 joins the outer ends of the spokes 18. The usual brake band 20 and brake blocks 21 are employed.

Referring more particularly to my device as distinguished from those forms now in use, it will be seen that I have constructed a special form of brake ring 22 which is secured to the flange 15 by means of the bolts 23 which pass through the brake ring inner flange 24, and also to the ring 19 by means of the bolts 25 which pass through the brake ring outer flange 26.

In the outer face of the brake ring 22 are formed a plurality of channels 27 and 28. Each channel 27 and 28 is provided with a dam 29, on one side of which is drilled a cold water inlet hole 30, and on the other side of the dam 29 is drilled a hot water outlet hole 31. The dams 29 in the channels 27 and 28 are not in line, but the dams in the channel 27 form one line and those in the channel 28 form another line. All of the holes 31 are between the two lines of dams, while half of the holes 30 are on one side of the two rows of dams, and the remaining half of the holes 30 are on the opposite side of the two rows of dams 29.

On the inner side of the brake ring 22 is formed a triple manifold 32 having the cold water channels 33 and the central hot water or discharge channel 34. Holes 35 in the bottom of the channels 33 receive the cold water pipes 36^A. Water is supplied to these pipes under pressure, preferably by means of a pump 36, whose discharge pipe 37 is supplied with a valve 38 by means of which the supply of water to the pipes 36^A may be controlled.

It will be understood that the manner of supplying cold water to the pipes 36^A is immaterial as long as there is ample pressure and a suitable means for controlling same. In the case illustrated, the control may be effected by throttling the pump 36, if desired, instead of controlling the flow of liquid through the pump discharge pipe 37. In some cases water under pressure may be available from gravity systems, and in other instances it may be more convenient to drive the pump with an electric or internal combustion motor.

The pipe 37 is connected to a swivel pipe 39, better illustrated in Fig. 2. The pipe 39 is supported and held against rotation by a bracket 40 secured to a bearing 10. The pipe 39 is held against the end of the shaft 11 by means of the stuffing box 41 which is secured to the shaft 11 by means of the screws 42. The usual packing 43 and gland 44 are employed. A wearing washer 45 is placed under the head of the swivel pipe 39. A hole 46 connects the swivel pipe 39 to the nipple 47 which is threaded into the shaft 11 and connected with the T 48 from which both pipes 36^A are supplied with cold water.

In the bottom of the channel 34 I have provided a hot water outlet hole 49 which is joined by the pipe 50 to the hole 51 in the shaft 11 from which the water is carried away through the swivel pipe 39^A. The stuffing box 41^A and gland 44^A are the same as the stuffing box box 41 and the gland 44. A hot water discharge pipe 52 is attached to the end of the swivel pipe 39^A and discharges into a funnel 53 from which the hot water may be disposed of as desired.

Around the outside of the brake ring 22 I have placed a brake tire 54 which is preferably shrunken into place and held in position by the bolts 55 which pass loosely through the brake ring 22. Driving dowels 56 pass through the brake tire 54 and brake ring 22 into the flange 15.

Before taking up the operation of the device it should first be stated that attempts have been made in the past to cool brakes in this class of devices by admitting water to the inside of the brake drums between the sides 15 and 22, or their equivalent, and depending upon centrifugal force to hold a quantity of water against the inside of the brake drum. Whenever the drum would stop, the water, of course, would be scattered around and what little cooling action the water might exhibit naturally ceased with the rotation of the drum. Furthermore, heat had to be conducted through a relatively thick brake ring wall before it could be absorbed by the water.

A brake such as described above should be regarded as a machine for transforming kinetic energy into heat, and it is evident that unless the product of this machine is carried away with sufficient rapidity, the machine itself will gradually be consumed by the heat which it has produced. I therefore have directed my efforts toward carrying away this heat as rapidly as it is generated, thereby greatly increasing the efficiency of the brake, as far as effective operation and durability are concerned.

In the operation of my device cold water is forced by the pump 36, or similar means, under the control of the valve 38 through the pipes 36^A and thence through the holes 35 into alternate ends of the channels 27 and 28 and after encircling the drum absorbing all of the heat that it can the water is forced out through the pipe 52, at which point the flow and temperature can be ascertained.

It will be observed that the flow of water in adjacent channels is in opposite directions, which results in a very uniform temperature being maintained around the brake tire 54.

In Fig. 7 I have illustrated a somewhat modified form of brake ring 22^A which has a smooth outer face. The channels 27 and 28 are formed on the interior of the brake tire 54^A. This simplifies the manufacture of the device and adds to the strength of the tire itself.

While I have thus illustrated and described my invention, I do not desire to limit myself to this precise form of construction, but intend to cover such forms and modifications as fall fairly within the appended claims.

What I claim as new is:

1. A brake drum having formed within same and close to its braking surface a plurality of passages; and means for circulating a cooling medium in opposite directions through said passages.

2. A brake drum consisting of a brake ring having secured around same a brake tire, said brake tire having channels formed in its inner face adapted to convey a cooling medium in one direction through alternate channels and in the opposite direction through the remaining channels.

3. A brake drum consisting of a rotatable brake ring having secured around same a brake tire, said ring and tire having formed between same a plurality of channels divided by walls adapted to support said tire on said ring against external forces; and means for circulating water in opposite directions through said channels in a manner to uniformly dissipate heat which may be generated on said brake tire.

4. A brake drum consisting of a rotatable cylinder having formed in its outer surface a plurality of channels having a dam across each of said channels; and means for injecting cold water into all of said channels on one side of said dams and discharging said water after it has traversed the full length of the channels, said water traveling in opposite directions in adjacent channels.

5. A brake drum consisting of a rotatable cylinder having formed in its outer surface a plurality of channels having placed across alternate channels two spaced rows of dams in a manner to make the ends of the adjacent channels overlap, a triple manifold formed on the inside of said drum the central section of said manifold lying under said overlapping channel ends, and having a port in the bottom of each overlapping channel opening into said central section, each channel also having an inlet port on the side of its dam opposite said first mentioned ports and opening into an outer portion of said manifold.

6. In a lowering engine, the combination of a cable drum having a side flange with a hollow brake drum having an inturned flange and a counterbore in said inturned flange adapted to receive said cable drum flange and to be secured by means of bolts passing through said cable drum flange and said brake drum flange and having radial driving dowels passing through said brake drum into said cable drum flange; and means for circulating a cooling medium in opposite directions around said hollow brake drum.

7. In a lowering engine, the combination of a brake drum having a plurality of passages formed therein close to its braking surface, and having a brake band, including a plurality of brake blocks, arranged to bear against the surface of said brake drum, a pump arranged to force cold water in opposite directions through adjacent channels, and pipe means for carrying off the water which has been heated by the braking action.

8. A lowering engine brake drum having a hollow braking surface including a plurality of closed channels adapted to permit the circulation of water around said brake drum in opposite directions in adjacent channels, a drum shaft carrying said brake drum and having hollow ends, means for injecting cold water into one of said shaft ends and conducting same to a closed end of each channel, a hot water discharge pipe leading from the opposite end of said channel to a hole in the side of said shaft connecting with its opposite hollow end, and a nonrotatable discharge pipe connecting with said last mentioned hollow end and discharging into an open funnel in a manner that the temperature and flow of said water may be readily observed.

9. In a lowering engine; a brake having in combination a shaft having a central opening formed at each end; a brake drum mounted on said shaft having a plurality of passages formed under the braking surface around said drum; a dam across each of said passages: pipe means for injecting cold water into one end of said shaft and thence into opposite ends of adjacent passageways near said dams; pump means for forcing cold water though said pipes; regulating means for controlling the flow of water through said pipe; and a hot water discharge pipe connecting the outlet end of every passageway with the opening in the other end of said shaft.

10. In a lowering engine, the combination of a drum shaft having a central hole formed in each of its ends, a drum gear mounted on said shaft, a cable drum secured to said drum gear, a brake ring secured to said cable drum having a plurality of channels formed in its outer surface and having a dam placed across each channel the dam of alternate channels lying in straight lines and those in adjacent channels having a space between same in a manner that the ends of the adjacent channels overlap, cold water supply pipes arranged to admit water to opposite ends of adjacent channels and tap into the side of said drum shaft making a connection with one of its central holes, a source of cold water connected with said last mentioned central hole, and a hot water discharge pipe connecting said channels with the second central opening through the side of said drum shaft.

HARRY E. BUKOWSKY.